United States Patent [19]

Nomura et al.

[11] Patent Number: 5,294,954
[45] Date of Patent: Mar. 15, 1994

[54] ROTATABLY CONTROLLABLE LENS HOOD AND COVER UNIT

[75] Inventors: Hiroshi Nomura, Tokyo; Tomoaki Kobayashi, Saitama, both of Japan

[73] Assignee: Asahi Kogaku Kogyo Kabushiki Kaisha, Tokyo, Japan

[21] Appl. No.: 811,695

[22] Filed: Dec. 20, 1991

Related U.S. Application Data

[63] Continuation-in-part of Ser. No. 800,161, Nov. 27, 1991, abandoned.

[30] Foreign Application Priority Data

Dec. 20, 1990 [JP] Japan .................................. 2-403799

[51] Int. Cl.$^5$ ........................... G03B 11/04; G02B 7/00
[52] U.S. Cl. .................................. 354/287; 359/511; 359/612
[58] Field of Search ............ 354/187, 287, 288, 295; 359/611, 612, 511

[56] References Cited

U.S. PATENT DOCUMENTS

| | | | |
|---|---|---|---|
| 4,002,402 | 1/1977 | Mito | 359/611 |
| 4,384,767 | 5/1983 | Kawai | 359/611 |
| 5,126,881 | 6/1992 | Crema | 359/611 |

FOREIGN PATENT DOCUMENTS

| | | |
|---|---|---|
| 62-244026 | 10/1987 | Japan . |
| 63-88811 | 6/1988 | Japan . |
| 3-13923 | 1/1991 | Japan . |

*Primary Examiner*—Michael L. Gellner
*Assistant Examiner*—J. K. Han
*Attorney, Agent, or Firm*—Kane, Dalsimer, Sullivan, Kurucz, Levy, Eisele and Richard

[57] ABSTRACT

A cover unit for lens unit having a lens barrel, which has a cylindrical support member to be coupled to an end of the lens barrel, at least one engaging pin member is provided at a predetermined position on the outer circumferential surface thereof. Further, the cover unit has a cylindrical hood member capable of being superposed on the lens barrel, at least one cam groove to slidably receive the at-least-one engaging pin member therein being formed on the inner circumferential surface of the hood member, wherein by means of the engagement of the at-least-one engaging pin member with the at-least-one cam groove, the hood member moves in its axial direction relative to the support member upon rotation of the hood member relative to the support member. Lens barriers are supported by the support member for covering the end of the lens barrel, the lens barrier means being openable. The lens barriers are driven in accordance with the movement of the hood member.

40 Claims, 17 Drawing Sheets

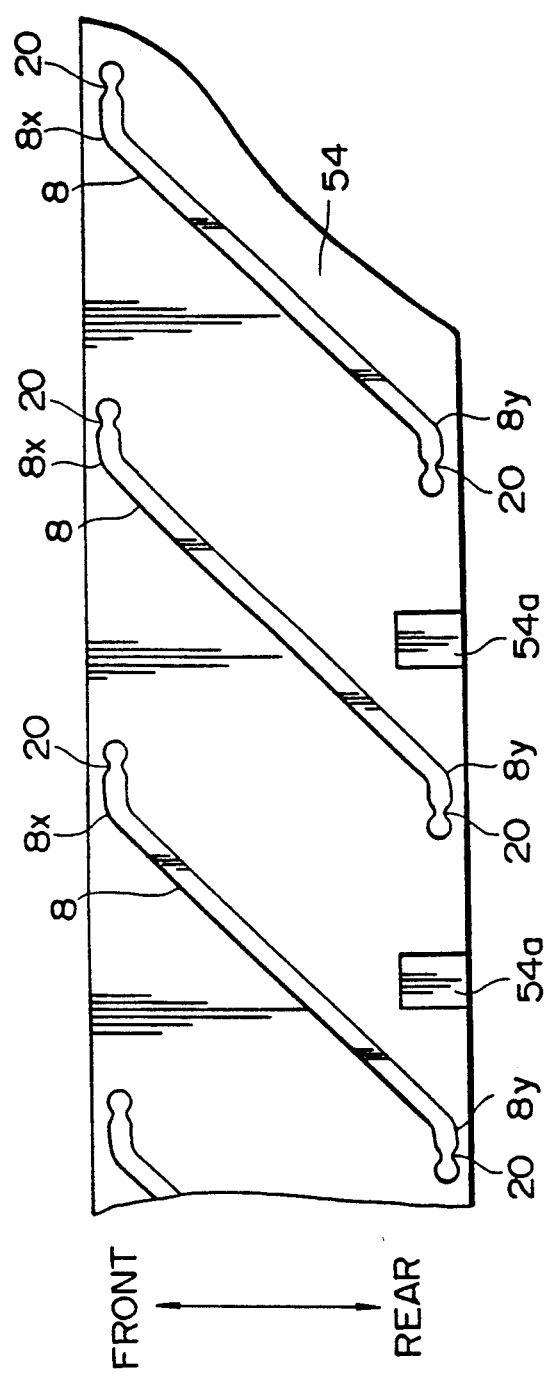

ROTATABLY CONTROLLABLE LENS HOOD AND COVER UNIT

This application is a continuation-in-part of application entitled "Lens Unit leaving Cylindrical Hood", filed on Nov. 27, 1991, in the name of Hiroshi Nomura and Tomoaki Kobayashi, Ser. No. 800,161, now abandoned.

BACKGROUND OF THE INVENTION

The present utility model relates to a cover unit for a lens unit of a camera.

Conventionally, a lens hood is adapted to a lens unit of a camera in order to prevent undesirable lights from entering into the lens from outside of an angle of view. Well known methods for adapting the hood to a camera lens are a screwed-type method, a bayonet-type method, and so on. In such methods, however, since the camera lens with adapting the hood is too big to carry on, the cylindrical hood is removed from the camera lens when the lens unit is not used turned about, and is fitted on the lens back to front when accommodated in a case.

In the constructions above, it is troublesome to remove the hood, further the hood may be lost because it is separated from the lens. In order to solve the above problem, there has been proposed a built-in-type hood wherein the hood is made shiftable in the back-and-forth direction with respect to the lens.

FIG. 13 shows an example of such a built-in-type hood. A camera lens 41 is attached to a camera body 40. The camera lens 41 includes a diaphragm ring 42 and a focus ring 43, which are rotatably coupled on a lens barrel 44 of the camera lens 41.

A cylindrical hood 45 is slidably inserted between an end portion of the lens barrel 44 and the focus ring 43. The rear end portion 45a of the hood 45 can be engaged with a front end portion 44a of the lens barrel 44.

With this arrangement, however, since the cylindrical hood 45 is constructed so as to be retracted inside the focus ring 43, the length of the cylindrical hood 45 is restricted depending upon the length of the focus ring 43, and therefore such a built-in-type cylindrical hood 45 may not have sufficient length to cut undesirous lights for certain camera lenses.

Moreover, with the construction above, since the angle of view differs depending on the kind of camera lens (for example, depending on the difference of focal lengths), it has been necessary to independently manufacture various cylindrical hoods having suitable lengths for respective camera lenses. Thus, the conventional built-in-type cylindrical hood was disadvantageous in view of manufacturing cost.

Furthermore, with such a built-in-type cylindrical hood, when carried on, if the lens barrel is inclined either upward or downward, there arises a problem that the cylindrical hood unexpectedly extends or retracts along the optical axis due to its weight.

Meanwhile, a lens cap is used to protect the lens surface, but the attachment and detachment thereof will be troublesome, and there will be a fear of losing the lens cap. For that reason, for example, in compact cameras, there has been known an openable lens barrier installed in front of a camera lens. Among a plurality of kinds of lens barriers, a shutter-type or double-door type lens barrier are well known. But, these types are complicated in construction and it is difficult to install them to exchangeable lenses, especially to large bore ones.

SUMMARY OF THE INVENTION

It is therefore an object of the invention to provide an improved cover unit for lens unit of a camera which has a movable hood and can easily be installed to a lens unit, and further is made openable in response to the movement of the lens hood.

For the above object, according to the present invention, there is provided a cover unit for lens unit having a lens barrel, comprising:

a cylindrical support member to be coupled to an end of the lens barrel, the support member having at least one engaging pin member provided at a predetermined position on the outer circumferential surface thereof;

a cylindrical hood member capable of being superposed on the lens barrel, at least one cam groove to slidably receive the at-least-one engaging pin member therein being formed on the inner circumferential surface of the hood member, wherein by means of the engagement of the at-least-one engaging pin member with the at-least-one cam groove, the hood member moves in its axial direction relative to the support member upon rotation of the hood member relative to the support member;

lens barrier means supported by the support member for covering the end of the lens barrel, the lens barrier means being openable; and drive means for driving the lens barrier means in accordance with the movement of the hood member.

Optionally, the lens barrier means comprises at least one plate member which is capable of opening and closing the end of the lens barrel, the at-least-one plate member being neutrally biased so as to normally close of end of the lens barrel.

According to another aspect of the invention, there is provided a lens unit, comprising:

a lens barrel having at least one engaging pin member provided at a predetermined position on the outer circumferential surface thereof; and a cylindrical hood member capable of being superposed on the lens barrel, at least one cam groove to slidably receive the pin member therein being formed on the inner circumferential surface of the hood member, wherein by means of the engagement of the at-least-one engaging pin member with the at-least-one cam groove, the hood member moves in its axial direction relative to the lens unit upon rotation of the hood member relative to the lens barrel.

The cylindrical hood member may be made of a synthetic resin material having a predetermined elasticity.

Optionally, a plurality of kinds of cam grooves for slidably receiving the pin member are provided on the inner circumferential surface of the hood member.

According to further aspect of the invention, there is provided a camera, comprising:

a photographing lens;

a lens barrel for accommodating the photographing lens, the lens barrel having at least one engaging pin member at a predetermined position on the outer circumferential surface thereof; and a cylindrical hood member capable of being superposed on the lens barrel, at least one cam groove to slidably receive the pin member therein being formed on the inner circumferential surface of the hood member, wherein by means of the engagement of the at-least-one cam groove, the hood member moves in its axial direction relative to the lens unit upon rotation of the hood member relative to the lens barrel.

According to still further aspect of the invention, there is provided a cover unit for lens unit having a lens barrel, comprising:

a cylindrical support member to be coupled to an end of the lens barrel, the support member having a small outer diameter portion having a predetermined length;

at least one plate member, which is capable of opening and closing the end of the lens barrel, the at-least-one plate member being neutrally biased so as to normally close the end of the lens barrel;

a hood member movable with respect to the support member in the direction of the optical axis of the lens unit; and an operation member for opening the at-least-one plate member slidably fitted on the small outer diameter portion of the support member, the operation member sliding on the small diameter portion between first and second positions in the axial direction thereof, the operation member moves in accordance with the movement of the hood member, wherein the at-least-one plate member is opened when the operation member is located at the first position.

Optionally, the support member has a threaded portion on the inner surface thereof, wherein the lens barrel has a threaded portion on the outer surface thereof, the cover unit being coupled to the lens barrel with the engagement between the threaded portions of the support member and the lens barrel.

Still further optionally, the lens barrel has an inner threaded portion on the inner circumferential surface thereof in order to receive an optical element provided with an outer threaded portion to be engaged with the inner threaded portion, and wherein one end of the support member is formed in a substantially U-shaped portion having inner cylindrical portion and an outer cylindrical portion so that the end portion of the lens barrel is fitted in the U-shaped portion, the outer circumferential surface of the inner cylindrical portion is threaded to be engaged with the inner threaded portion of the lens barrel, whereby the support member can be coupled to the lens unit even if an optical element having a first outer threaded portion to be engaged with the inner threaded portion of the lens barrel at one end and a second inner threaded portion having the same diameter as the inner threaded portion of the lens barrel is adapted to the lens barrel.

DESCRIPTION OF THE ACCOMPANYING DRAWINGS

Figure 10A:
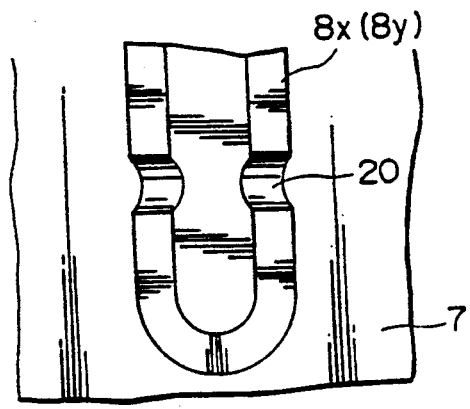
Figure 10B:
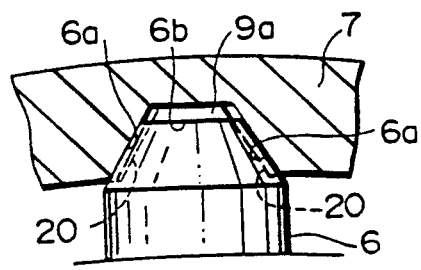
Figure 10C:
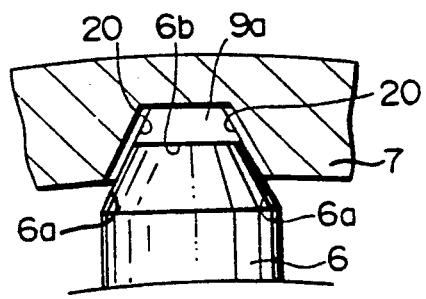
Figure 11A:
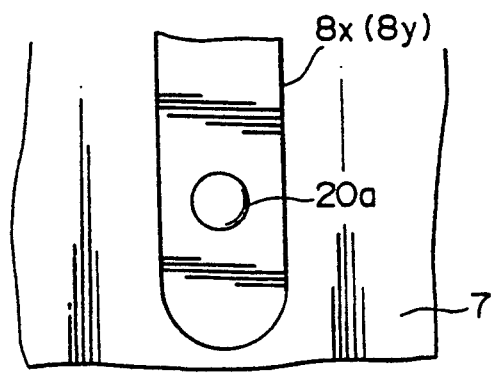
Figure 11B:
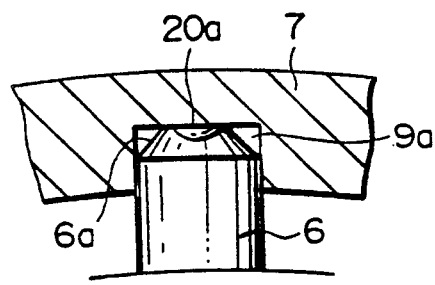
Figure 11C:
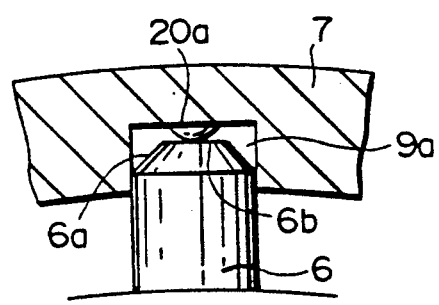
Figure 12A:
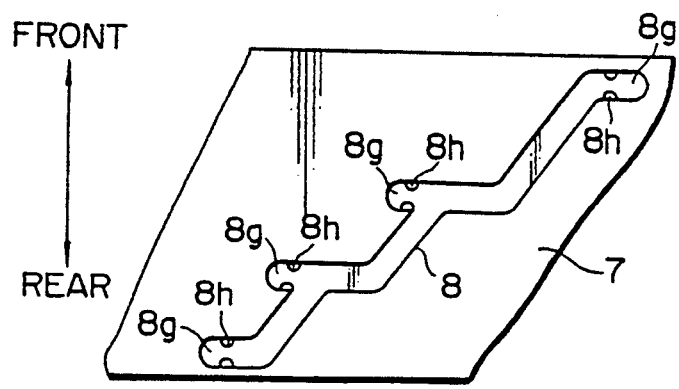
Figure 12B:
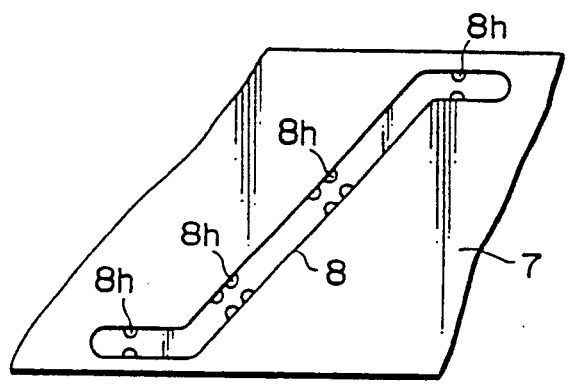
Figure 12C:
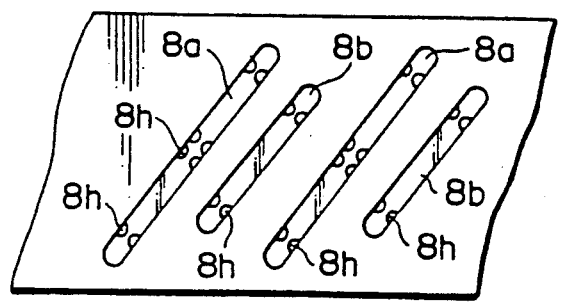
Figure 13:
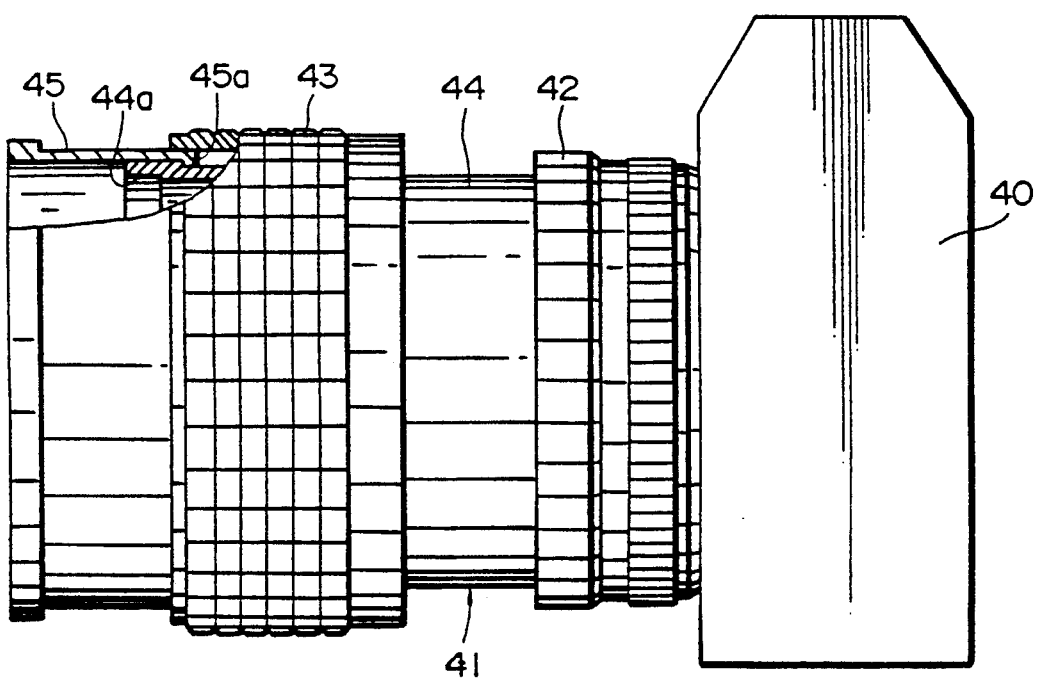
Figure 14A:
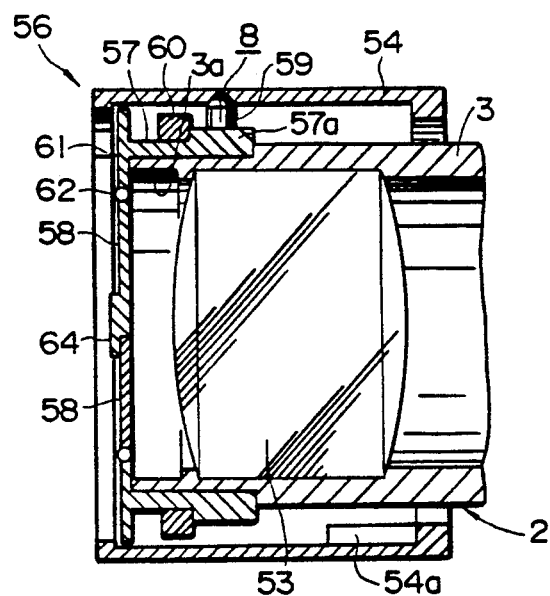
Figure 14B:
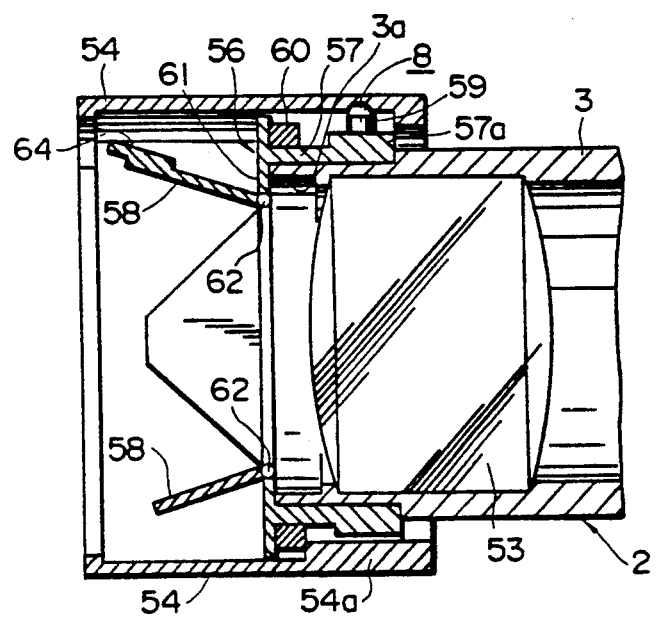
Figure 15A:
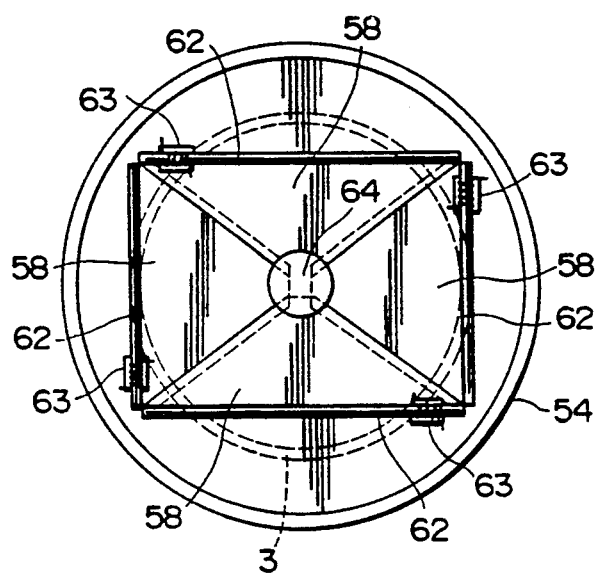
Figure 15B:
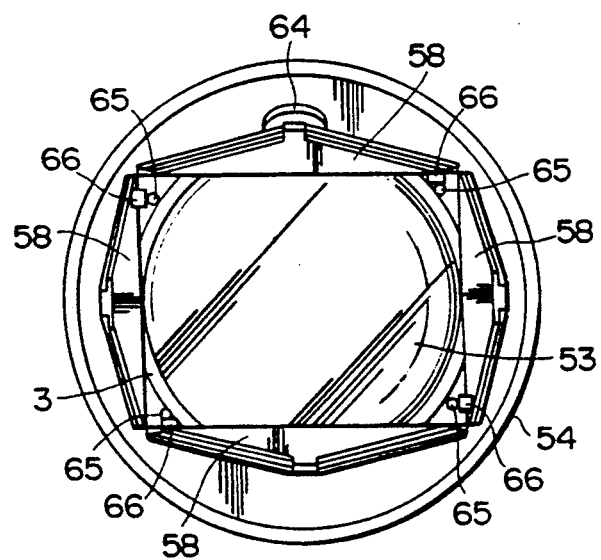
Figure 16:
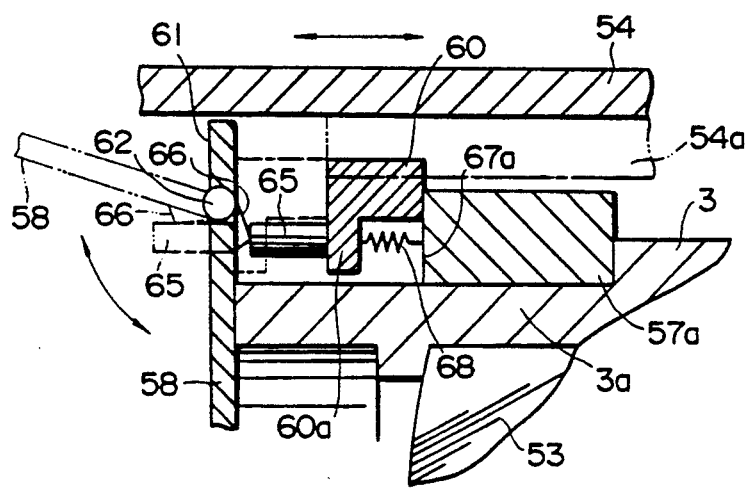
Figure 17:
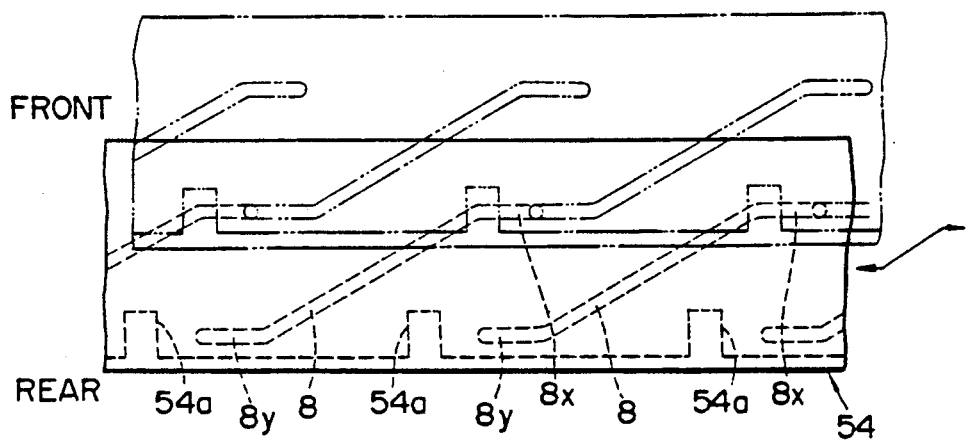
Figure 18:
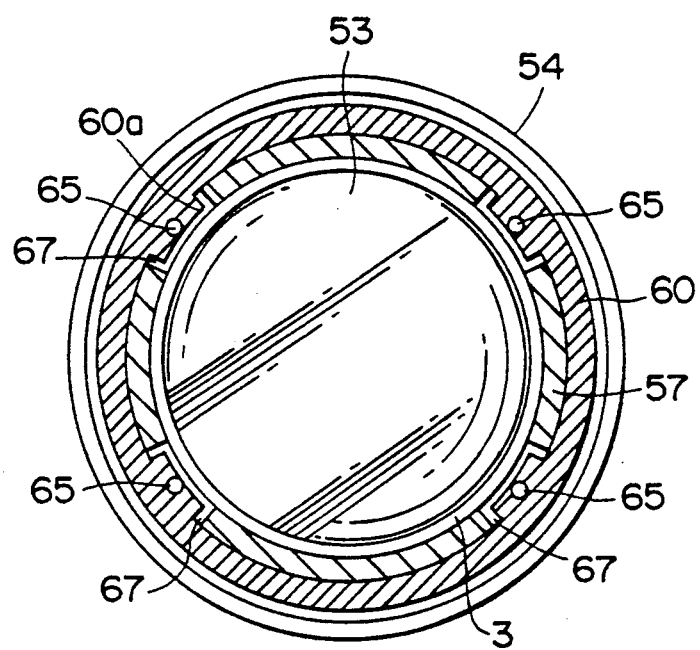
Figure 20A:
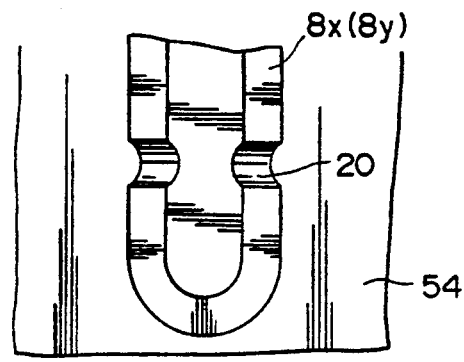
Figure 20B:
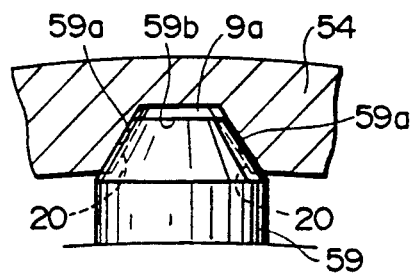
Figure 20C:
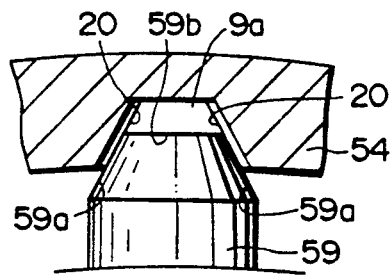
Figure 21A:
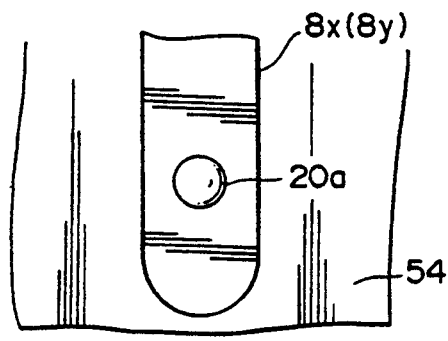
Figure 21B:
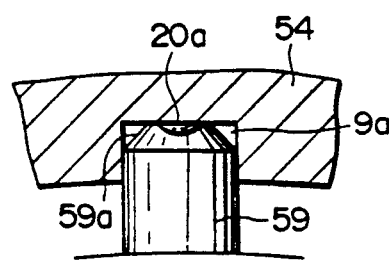
Figure 21C:
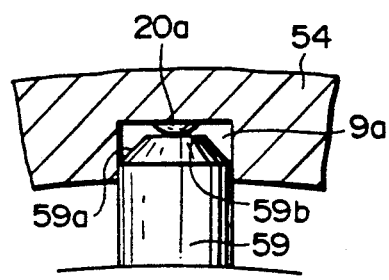
Figure 22A:
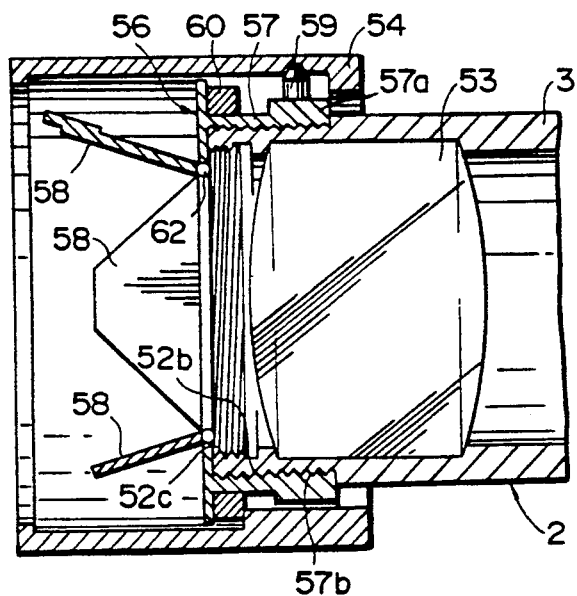
Figure 22B:
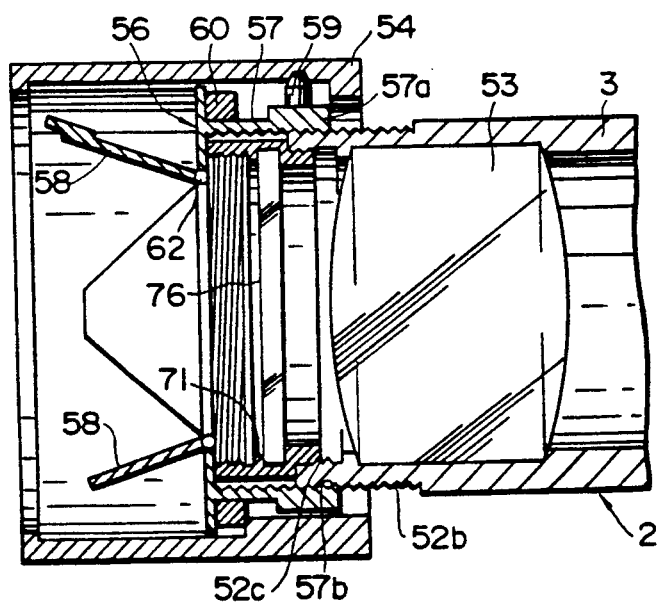
Figure 23A:
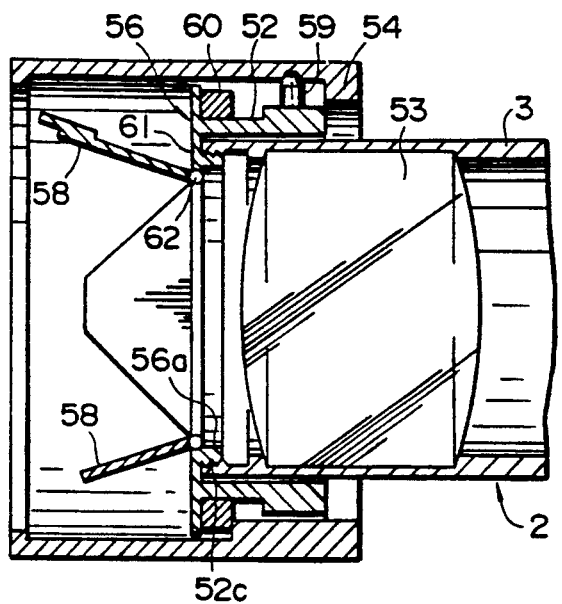
Figure 23B:
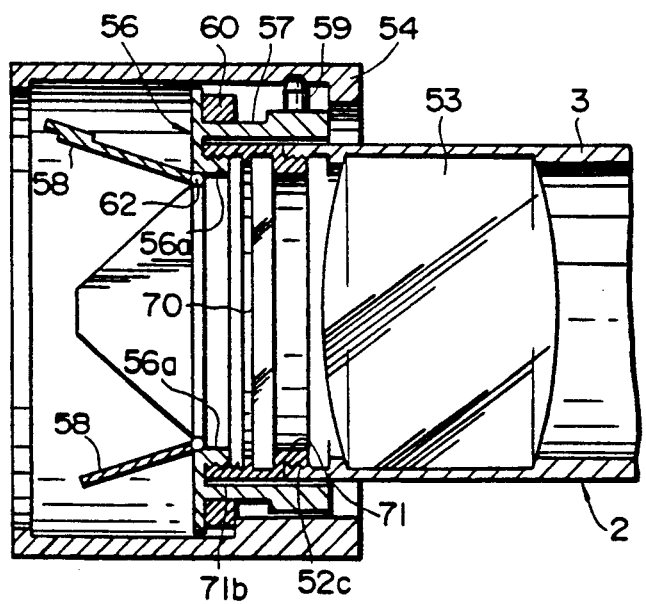

FIGS. 10A, 10B, and 10C are enlarged views showing detail structure of an interfering portion;

FIGS. 11A, 11B, and 11C are enlarged views showing detail structure of modified interfering portion;

FIGS. 12A, 12B and 12C show the fourth, fifth, and first embodiments, respectively, of the present invention;

FIG. 13 is a side view showing a camera equipped with a camera lens unit having a conventional built-in-type cylindrical hood;

FIG. 14A is a partial cross sectional side view of a cover unit installed to a lens unit of a camera, wherein the lens barriers are closed;

FIG. 14B is a partial cross sectional side view of a cover unit, wherein the lens barriers are opened;

FIG. 15A is the front view of a cover unit embodying the present invention, wherein the lens barriers are closed;

FIG. 15B is the front view of a lens unit, wherein the lens barriers are opened;

FIG. 16 is a partially enlarged cross sectional side view of the cover unit;

FIG. 17 shows a development of a lens hood according to the present invention;

FIG. 18 is a cross sectional front view of the cover unit installed to the lens unit;

FIG. 19 shows a development of the cylindrical hood illustrating modified feed grooves;

FIGS. 20A, 20B, and 20C are enlarged views showing detail structure of an interfering portion;

FIGS. 21A, 21B, and 21C are enlarged views showing detail structure of modified interfering portion;

FIG. 22A is a partial cross sectional side view of a first modified embodiment of the cover unit;

FIG. 22B shows the first modified embodiment with a filter being attached;

FIG. 23A is a partial cross sectional side view of a second embodiment of the cover unit; and FIG. 23B is the second modified embodiment with a filter being attached.

DESCRIPTION OF THE EMBODIMENTS

Figure 1:
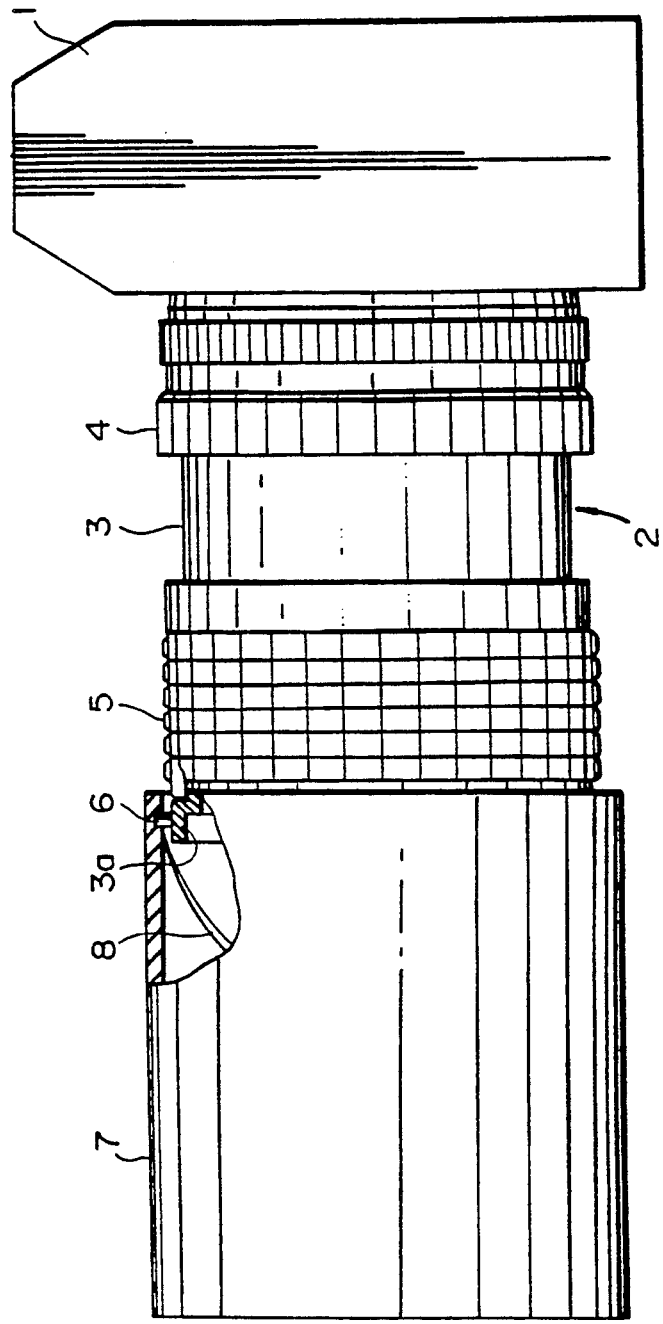
FIG. 1 is a partially broken side view of a camera equipped with a camera lens unit having a cylindrical hood disposed in an extended position in accordance with the present invention.
Figure 2:
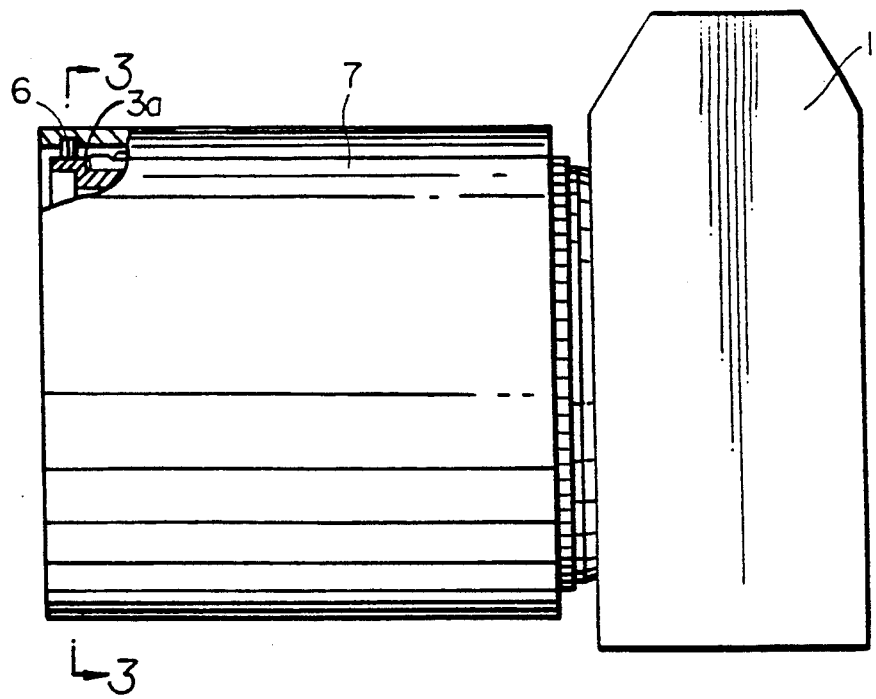
FIG. 2 is a partially broken side view of a camera equipped with the camera lens unit with a cylindrical hood disposed in a retracted position.
Figure 3:
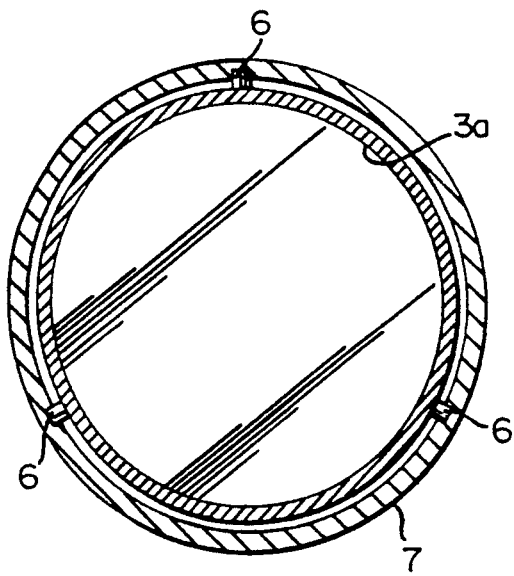
FIG. 3 is a cross-sectional view taken along a line A—A of FIG. 2.

FIGS. 1 and 2 are side views of a camera to which a cylindrical lens hood is adapted. In FIG. 1, the hood 7 is positioned on the most extended position, and in FIG. 2 on a retracted position. FIG. 3 is a cross-sectional view taken along a line A—A of FIG. 2.

In the drawings, a camera lens 2 is detachably attached to a lens mount of a camera body 1. The camera lens 2 includes a ring (diaphragm ring) 4 for setting an aperture value and a ring (focus ring) 5 for focusing, which are provided rotatably on a lens barrel 3 of the camera lens 2. This focus adjusting mechanism is a so-called helicoid type, wherein provided is an inner barrel cylinder 3a for accommodating a lens inside the lens barrel 3. The focus ring 5 and the inner barrel 3a moves in the direction of optical axis thereof at a predetermined amount upon rotation of the focus ring 5.

Figure 4:
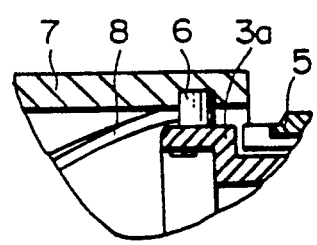
FIG. 4 is an enlarged view showing a detail structure of a front edge portion of a camera lens.

FIG. 4 is an enlarged side view showing detail structure of a front edge portion of a camera lens 2. On an outer circumferential surface of the front edge portion of the inner barrel 3a, there are provided three engaging pins 6, 6, 6 at predetermined intervals, as shown in FIG. 3. The head portion 6a of the engaging pin 6 is formed in a tapered-configuration as is explained in detail later with referring to FIGS. 7 and 8.

Figure 5:
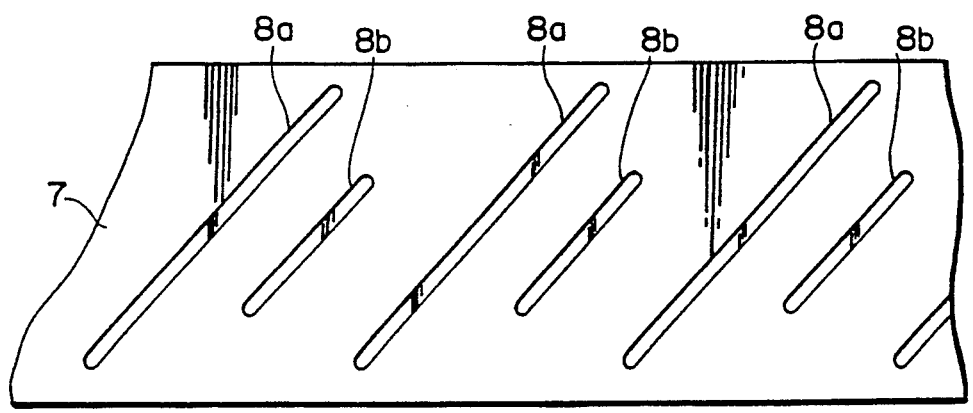
FIG. 5 shows a development of a cylindrical hood according to a first embodiment of the present invention.

On the inner surface of a cylindrical lens hood 7, there are formed spiral-shaped feed grooves 8, 8, 8. FIG. 5 is a development of the cylindrical lens hood 7, on an inner surface of which there are alternately provided a plurality of feed grooves 8a, 8a, 8a and feed grooves 8b, 8b, 8b. The feed groove 8b is shorter than the feed groove 8a. The feed grooves 8a, 8a, 8a and 8b, 8b, 8b are respectively formed at the predetermined intervals in a circumferential direction, and the numbers of the feed grooves 8a and 8b respectively coincides with the number of the engaging pins 6, 6, 6. That is, in this first embodiment, the numbers of the feed grooves 8a and the feed grooves 8b are equally three.

Figure 6:
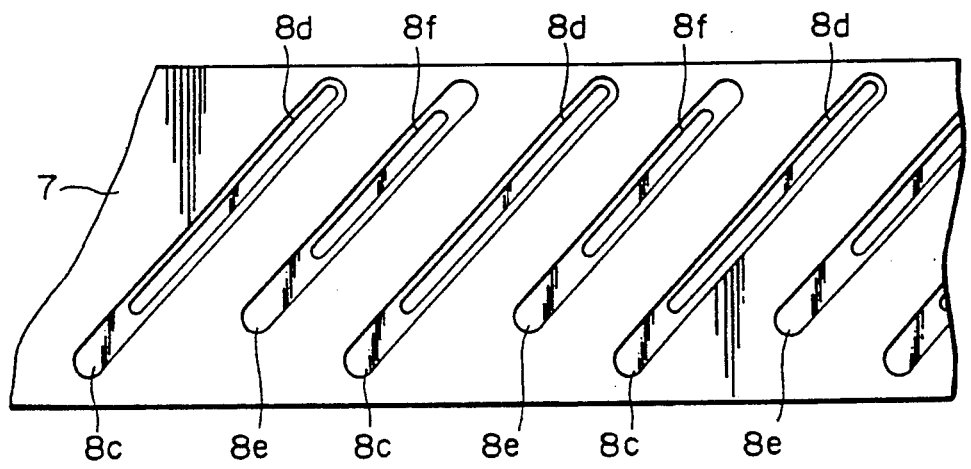
FIG. 6 shows a development of the hood according to a second embodiment of the present invention.
Figure 7:
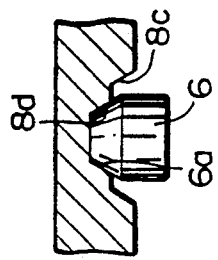
FIGS. 7 and 8 are enlarged cross-sectional views showing structures of the grooves and the pins in accordance with the first and the second embodiments of the present invention.
Figure 8:
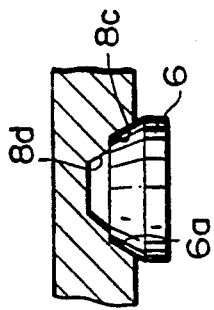

FIG. 6 shows a second embodiment of the feed groove 8, in which two feed grooves 8c and 8e respectively having different lengths are alternately provided on the inner surface of the cylindrical hood 7, and other kinds of feed grooves 8d and 8f are respectively formed in the feed grooves 8c and 8e. The feed grooves 8d and 8f are respectively formed to be grooves deeply stepped into the feed grooves 8c and 8e, as shown in FIGS. 7 and 8. That is, in this second embodiment, four different lengths of feed grooves 8c, 8d, 8e, and 8f are formed, and the feed grooves 8c and 8e have wider widths than the feed grooves 8d and 8f. Accordingly, the widths of the engaging pins 6 provided at the edge portion of the inner barrel 3a of the respective camera lens are differed as shown in FIGS. 7 and 8 so as to be engaged with the appropriate one of the feed grooves 8c, 8d, 8e, and 8f.

Figure 9:
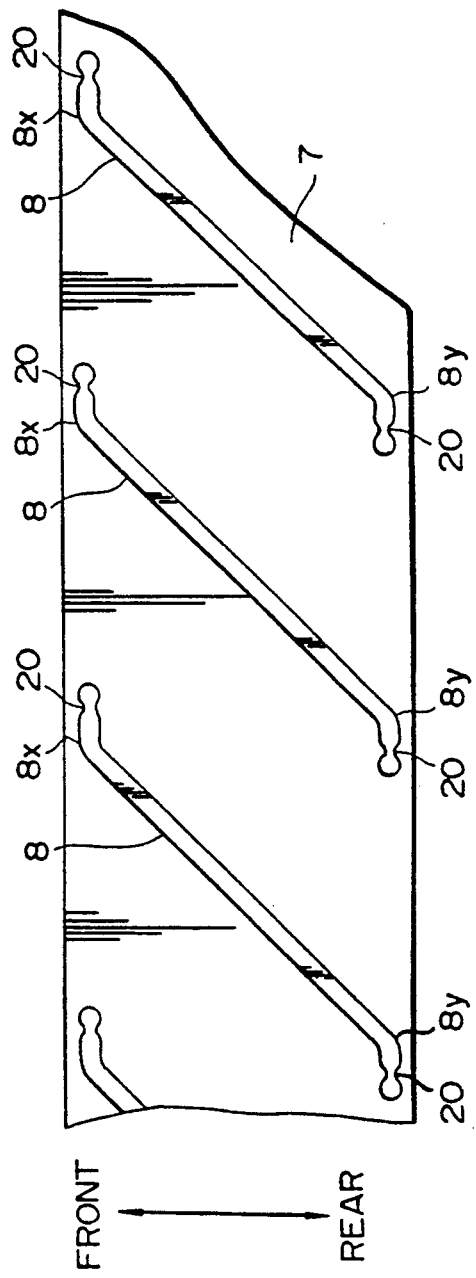
FIG. 9 shows a development of the cylindrical hood in accordance with the third embodiment of the present invention.

FIG. 9 is a development of the cylindrical hood 7 in accordance with the third embodiment of the present invention. In the drawing, a plurality of feed grooves 8 are formed uniformly spaced apart in a circumferential direction so as to be engaged with the corresponding engaging pins B. The front edge portion 8x and the rear edge portion 8y of the each feed groove 8 are bent along a circumferential and opposite direction. Moreover, there is formed an interfering portion 20 at each of the front edge bent portion 8x and the rear edge bent portion 8y of the feed groove 8.

FIG. 10A is an enlarged plan view showing a detail structure of the engaging portion 20 and FIGS. 10B and 10C are enlarged side views illustrating engagement between the interfering portion 20 and the engaging pin 6. The interfering portion 20 is constructed by deforming the feed groove 8 in such a manner that the both side walls of the feed groove 8 are swollen inwardly so as to form the width of the feed groove 8 narrower than that of the engaging pin 6.

FIG. 11A is an enlarged plan view showing a modified interfering portion 20a, and FIGS. 11B and 11C are enlarged side views illustrating engagement of the interfering portion 20a and the engaging pin 6. In this modified embodiment, there is provided a convex interfering portion 20a on the bottom surface of the feed groove 8 so that the head portion 6a of the engaging pin 6 interferes with this convex interfering portion 20a when the engaging pin 6 passes this interfering portion 20a. In FIGS. 10B, 10C and 11B, 11C, a clearance 9a for allowing dust or sand to escape therefrom. With this clearance 9a defined by the feed groove 8 and the engaging pin 6, when the engaging pin 6 moves in the feed groove 8 as the cylindrical hood 7 is rotated, dust or sand is pushed away to the vacant space 9a, therefore the rotation of the cylindrical hood 7 can be kept in a smoothly rotatable condition without being influenced by the sand and so on.

FIGS. 12A and 12B are views showing a fourth and a fifth embodiments of the feed groove 8. In the forth embodiment, as shown in FIG. 12A, the feed groove 8 includes a plurality of extended portions 8g which extend in the circumferential direction of the hood 7. In the fifth embodiment, as shown in FIGS. 12A and 12B, there are provided engaging projections 8h for holding the engaging pins 6 at respective portions in a longitudinal direction. With these arrangement, the engaging pin 6 can be held at the predetermined position by virtue of the extended portions 8g or the engaging projections 8h. Therefore, it becomes possible to adjust the cylindrical hood 7 at an appropriate length corresponding to any angle of view in the case that the camera lens has a plurality of focal lengths such as zoom lens.

Similarly, as shown in FIG. 12C, the projections 8h can be provided in the grooves 8a and 8b of FIG. 5.

The cylindrical hood 7 is made of a synthetic resin material having a predetermined elasticity, and the length of which is approximately the same as the total length of the camera lens 2, and further the hood 7 has a sufficient inner radius so as to be able to accommodate the focus ring 5, the diaphragm ring 4 and other external operation members.

This cylindrical hood 7 is adapted to the camera lens 2 such that the feed grooves 8 formed on its inner surface accurately engage with the engaging pins 6 provided on the front edge portion of the lens barrel 3. In this case, for example in the embodiment of FIG. 6, if appropriate engaging pins 6, in accordance with the focal length of the camera lens, are provided on the camera lens 2 to be attached, a suitable feed groove is selected among the plurality of different feed grooves 8c, 8d, 8e, and 8f as the specified one of the feed grooves are engaged with the engaging pins 6.

Next, operation of the above-described embodiments are explained.

In the first and the second embodiments, first of all, the cylindrical hood 7 is rotated in one direction. At this moment, since the spiral-shaped feed groove 8 is engaged with the engaging pin 6 which is fixedly provided on the front edge portion of the inner cylinder 3a, the cylindrical hood 7 is moved in the direction of the optical axis of the camera lens 2. As the cylindrical hood is rotated, it reaches most extended position as shown in FIG. 1.

When the cylindrical hood 7 is rotated in the opposite direction, it is retracted toward the rear end of the camera lens 2. The shiftable amount, i.e. an extendible amount or a retractable amount, of the cylindrical hood 7 depends on the length of the feed groove 8 to be engaged with the pin 6.

In the third embodiment, when the cylindrical hood 7 is rotated in one direction, by virtue of the engagement structure of the spiral-shaped feed groove 8 and the engaging pin 6 fixedly provided on the front edge portion of the inner barrel 3a, the cylindrical hood 7 advances forward. Then, when the engaging pin 6 reached to the rear edge bent portion 8y provided in the rear end portion of the feed groove 8, the engaging pin 6 is abutted against the interfering portion 20 as shown in FIG. 10B. Thereafter, as the cylindrical hood 7 is further rotated, the cylindrical hood 7 is slightly raised upward as the interfering portion 20 is pushed by the engaging pin 6 as shown in FIG. 10C, since the cylindrical hood 7 is made of synthetic resin material having elastically deformable nature.

When the dead end portion of the groove 8 reaches the engaging pin 6, the rotation of the cylindrical hood 7 is stopped. The interfering portion 20 (or 20a) is positioned spaced from the dead end by a predetermined distance away so that the engaging pin 6 can be held firmly without any play between the dead end and the interfering portion 20 (or 20a). In other words, the cylindrical hood 7 is prevented from unexpectedly rotating in the opposite direction due to its weight. With these arrangements, the cylindrical hood 7 is fixed at the most extended position wherein the cylindrical hood 7 extends in front of the camera lens 2 as shown in FIG. 1.

When a sufficient large rotational force is applied to the cylindrical hood 7 in the opposite direction, the interfering portion 20 (or 20a) deforms elastically as explained above, the cylindrical hood 7 retracts toward the rear end of the camera lens 2. When the front edge bent portion 8x of the feed groove 8 reaches the engaging pin 6, if slightly stronger rotational force is applied to the cylindrical hood 7, the interfering portion 20 (or 20a) formed in the front edge bent portion 8x deforms elastically as the engaging pin 6 is abutted against, then the engaging pin 6 finally reaches the front dead end of the feed groove 8. In this retracted condition, the cylindrical hood 7 covers the overall length of the camera lens 2 as shown FIG. 2, and the engaging pin 6 is firmly held without any play between the interfering portion 20 (20a) and the front dead end of the feed groove 8.

In the fourth embodiment, the engaging pin 6 can be engaged with any one of the extending groove portions 8g after the hood 7 is rotated and extended or retracted by predetermined amounts. Thus, in this fourth embodiment, at least one engaging portion for being engaged with the engaging pin 6 is provided in a longitudinal intermediate portion of the feed groove 8, therefore the cylindrical hood 7 can be positioned at the predetermined intermediate position before the cylindrical hood 7 is located at the most extended position. Similarly, to retract the cylindrical hood 7, the cylindrical hood 7 is rotated so that the extended portion 8g is apart from the engaging pin 6, then the cylindrical hood 7 is reversely rotated and is backed toward the rear end of the camera lens 2. If required to fix the cylindrical hood 7 at an intermediate portion before it returned to the most retracted position, one of the intermediate extended portions 8g is engaged with the engaging pin 6 in order to adjust the length of the cylindrical hood 7 so as to fit to each of angles of fields corresponding to a plurality of focal-length, particularly to a zoom-type camera lens which is capable of changing its focal-length.

In the fifth embodiment, operation is similar to the third embodiment, that is, the engaging projections 8h are provided at a front edge bent portion and a rear edge bent portion of the feed groove 8, therefore, when the cylindrical hood 7 rotates in one direction, by virtue of the engagement structure of the spiral-shaped feed groove 8 and the engaging pin 6 fixedly provided on the front edge portion of the inner cylinder 3a, the cylindrical hood 7 advances forward as it rotates along the feed groove 8. And then, when the front or rear edge bent portion of the feed groove 8 reaches the engaging pin 6, the engaging pin 6 is abutted against the engaging projections 8h, then the cylindrical hood 7 is pushed by the engaging pin 6 and slightly raised upward as the cylindrical hood 7 is further moved and the engaging pin 6 climbs over the engaging projections 8h in the feed groove 8 as shown in FIG. 10C. When the dead end portion of the feed groove 8 reached the engaging pin 6, the rotation of the cylindrical hood 7 is stopped. The engaging projections 8h are positioned spaced from the dead end by a predetermined distance away so that the engaging pin 6 can be held firmly without any play between the dead end and the engaging projection 8h in the front (or rear) edge bent portion of the feed groove 8. Thus, the cylindrical hood 7 is prevented from undesirably being rotated due to its weight. With these arrangements, the cylindrical hood 7 is fixed in an extended position wherein the cylindrical hood 7 extends with respect to the front end of the camera lens 2 as shown in FIG. 1.

Furthermore, if it is required to locate the cylindrical hood 7 at an intermediate position in the direction of the optical axis of the camera lens 2, the engaging pin 6 can be engaged with one of predetermined intermediate positions of the feed groove 8 defined by the plurality of intermediate engaging projections 8h as shown in FIGS. 12A, 12B and 12C. The intermediate engaging projections 8h are consisted of two pairs of two opposed projections. Namely, when the engaging pin 6 reached to the intermediate engaging projection 8h, if slightly excessive force is applied on the cylindrical hood 7 in a rotational direction, the engaging pin 6 is caught between the two pairs of the opposed projections 8h. Thus, the cylindrical hood 7 can be stopped at any of the predetermined intermediate positions. Further, if an excessive rotational force is applied on the cylindrical hood 7 in the same direction, the engaging pin 6 can easily be released from the intermediate positions.

Though the present invention is explained based on the specific embodiments, the present invention can be realized in other embodiments without departing from the scope of this invention. For instance, the focus adjusting mechanism is not limited to the helicoid type, and the construction of the camera lens 2, the configuration of the feed groove 8 of the cylindrical hood 7, the shape of the engaging pin 6 are also not limited to the above-disclosed ones. Moreover, the engaging pin 6 can be provided on the front end portion of the focus ring 5 instead of the lens barrel 3. On the other hand, though the cylindrical hood 7 is made of an elastically deformable synthetic resin material, it is possible to make the engaging pin 6 of an elastically deformable synthetic material instead of the cylindrical hood 7.

In accordance with the present invention, if the front edge portion of the lens barrel of the camera lens has enough space to provide a plurality of engaging pins, it is Possible for any type of cameras to install a telescopic-type cylindrical hood, and to move the cylindrical hood back-and-forth by simply rotating it.

Further, in accordance with the first and the second embodiments of the present invention, there are formed the plural type of grooves on the inner surface of the cylindrical hood, accordingly, a single hood can be applied to various type of camera lenses each having a different focal length, thus the manufacturing cost of the cylindrical hood can be reduced. Furthermore, in accordance with the third embodiment of the present invention, there are provided engaging portions at the front and the rear end portions, which firmly hold the engaging pin at the dead end of the groove. Therefore, the cylindrical hood can be prevented from unexpectedly extending or shrinking due to its weight, resulting in improved handiness in carry. Moreover, in accordance with the forth and the fifth embodiments of the present invention, by providing at least one engaging portion for fixing the engaging pin in a longitudinal intermediate portion of the groove, it becomes possible to adjust the extending length of the cylindrical hood so as to fit to each of angles of view corresponding to a plurality of focal-length, particularly it brings great advantageous effect to a camera lens which is capable of changing its focal-length, i.e., the zoom lens.

In the embodiments, the engaging pin is fixedly provided on the lens barrel. However, it is possible to arrange such that at least one engaging pin is biased in the direction in which the engaging pin outwardly presses the hood member.

FIGS. 14A and 14B are partial cross sectional side views of a lens unit of a camera in the lengthwise direction of a camera lens. In FIG. 14A, the lens barrier closed, in FIG. 14B opened. FIGS. 15A and 15B are front views of a lens unit embodying the present invention. In FIG. 15A, the lens barrier is closed, and in FIG. 15B opened.

A photographic lens 53 is accommodated in a lens barrel 3 of a lens unit 2, which is to be mounted to a camera body. A focusing mechanism of the lens unit 2 of the present embodiment is so called a helicoid-type, and it is so designed that the lens barrel 3 is moved in the axial direction of the photographic lens 53 when a focus ring is operated.

In FIGS. 14A and 14B, a cover unit 56 for a lens unit of a camera is coupled to a front end portion of the lens barrel 3. In the cover unit 56, provided are a lens barriers 58, a support ring 57 for swingably supporting the lens barriers 58, a cylindrical lens hood 54, an operation member including an operation ring 60 slidably fitted on the support ring 57. Further, a plurality of engaging pin members 59 are provided on the outer circumferential surface of the support ring 57 to be engaged with feed grooves 8 respectively provided on the inner circumferential surface of the lens barrel 3.

The support ring 57 is fixedly fitted on the front edge portion 3a of the lens barrel 3. On the support ring 57, a plurality of slits 67 are formed at predetermined intervals in the circumferential direction, each of the slits 67 extending in the axial direction of the support ring 57 as shown in FIG. 18.

As shown in FIG. 15, there are four pieces of lens barriers 58, and each of which is pivotally supported by means of a pin 62 onto a supporting surface 61 formed on the front side end (left-hand end in the figure) portion of the support ring 57. Springs 63 are respectively provided around the pins 62 so that the lens barriers 58 are biassed to close the front end of the lens unit 2.

A light shield plate 64 is integrally formed at the free end of one of the lens barriers 58. When all the lens barriers 58 are closed, a gap formed at the free ends of the lens barriers 58 can be covered with the light shield plate 64. As shown in FIG. 16, a protruding or projecting portion 66 is formed on the back surface of each lens barrier 58 at the portion adjacent to the respective pin 62. The projecting portion 66 is pressed by a pin member 65 formed on the front surface (left-hand side surface in FIG. 16) of the operation ring 60. The barrier 58 is opened when the operation ring 60 is moved leftward in the figure. The projecting portion 66 is formed such that the lens barriers 58 can prevent the undesirable light coming out of the angle of view of the lens 3 when the pin members 65 fully pushed the projecting portion 66 and the lens barriers 58 are opened as shown by imaginary lines in FIG. 16.

The operation ring 60 is slidably fitted on the small diameter portion of the support ring 57 as shown in FIG. 18. Tongue portions 60a are formed on the inner circumferential surface of the operation ring 60 at the position corresponding to the respective slits 67 (also as shown in FIG. 16). The pin members 65 are fixedly provided on the tongue portions 60a, respectively. Pull springs 68 are provided between the operation ring 60 and the rear end portion 57a of the support ring 57. One end of each pull spring 68 is connected to the rear surface (right-hand surface in FIG. 16) of one of the tongue portions 60a, and the other end of the pull spring 68 is connected to the front surface 67a of the rear end portion 57a of the support ring 57 confronting, the respective slits 67. The operation ring 60 is biased toward the rear end portion 57a of the support ring 57. Accordingly, the barriers 58 neutrally close the front end of the lens unit 2.

The lens hood 54 is provided around the lens barrel 3 so that it can be moved in the axial and circumferential directions thereof.

FIG. 17 shows a development of the lens hood 54. As shown in the figure, feed grooves 8 are formed in spiral shape in the axial direction on the inner circumferential surface of the lens hood 54. The feed grooves 8 are formed in correspondence with engaging pins 59. Both ends of each feed groove 8x and 8y are formed to be oppositely bent in the circumferential direction of the hood 54. Operating protrusions 54a extending in the axial direction of the lens hood 54 are formed on the inner circumferential surface of the lens hood 54 at certain intervals in the circumferential direction at the rear end portion of the lens hood 54.

Next, the operation of the above-described embodiment will be described.

When the lens hood 54 is rotated in one direction, with the engagement between the feed grooves 8 and the engaging pins 59, the lens hood 54 is fed in the axial direction thereof.

When the lens hood 54 is extended, the operating portions 54a are abutted against the operation ring 60. As the lens hood 54 is kept being extended, the pin members 65 push the respective projecting portions 66 formed on the rear surface of the lens barriers 58 providing drive means so that, the lens barriers 58 are swung about the pins 62 and opened, respectively.

When the lens hood 54 is rotated in the reverse direction, the lens hood 54 is retracted, as the feed grooves 8 follow the pin engaging pins 59, respectively. Simultaneously, the operation ring 60 which is pushed with the operating protrusions 54a of the lens hood 54 is retracted due the biasing force of the pull spring 68. Accordingly, the pin members 65 are discontacted from the projecting portions 66 of the lens barriers 58, so that the lens barriers 58 can be closed due to the biasing force of the springs 63. Furthermore, the retracted operation ring 60 is contacted to the rear end part 57a of the support ring 57.

FIG. 19 is a development of a modified cylindrical hood 54. In the drawing, a plurality of feed grooves 8 are formed uniformly spaced apart in a circumferential direction so as to be engaged with the corresponding engaging pins 59. The front edge portion 8x and the rear edge portion 8y of the each feed groove 8 are bent along a circumferential and opposite direction similar to the embodiment shown in FIG. 17. Moreover, there is formed an interfering portion 20 at each of the front edge bent portion 8x and the rear edge bent portion 8y of the feed groove 8.

FIG. 20A is an enlarged plan view showing a detail structure of the engaging portion 20 and FIGS. 20B and 20C are enlarged side views illustrating engagement between the interfering portion 20 and the engaging pin 59. The interfering portion 20 is constructed by deforming the feed groove 8 in such a manner that the both side walls of the feed groove 8 are swollen inwardly so as to form the width of the feed groove 8 narrower than that of the engaging pin 59.

FIG. 21A is an enlarged plane view showing a modified interfering portion 20a, and FIGS. 21B and 21C are enlarged side views illustrating engagement of the interfering portion 20a and the engaging pin 59. In this modified interfering portion 20a, there is provided a convex interfering portion 20a on the bottom surface of the feed groove 8 so that the head portion 59a of the engaging pin 59 interferes with this convex interfering portion 20a when the engaging pin 59 passes this interfering portion 20a. In FIGS. 20B, 20C and 21B, 21C, a clearance 9a is defined for allowing dust or sand to escape therefrom. With this clearance 9a defined by the feed groove 8 and the engaging pin 59, when the engaging pin 59 relatively moves in the feed groove 8 as the cylindrical hood 7 is rotated, dust or sand is pushed away to the clearance 9a, therefore the rotation of the cylindrical hood 7 can be kept in a smoothly rotatable condition without being influenced by the sand, dust, and so on.

The cylindrical hood 54 is made of a synthetic resin material having a predetermined elasticity, and the hood 54 has a sufficient inner radius so as to be able to be superposed around lens unit.

In the modified embodiments provided with the interfering portion 20 or 20a, when the cylindrical hood 54 is rotated in one direction, by virtue of the engagement structure of the spiral-shaped feed groove 8 and the engaging pin 59 fixedly provided on the rear end portion of the support ring 57, the cylindrical hood 54 is extended. Then, when the engaging pin 59 reached to the rear edge bent portion 8y provided in the rear end portion of the feed groove 8, the engaging pin 59 is abutted against the interfering portion 20 as shown in FIG. 20B. Thereafter, as the cylindrical hood 54 is further rotated, the cylindrical hood 54 is slightly raised outward as the interfering portion 20 is pushed by the head 59b of the engaging pin 59 as shown in FIG. 20C, since the cylindrical hood 54 is made of synthetic resin material having elastically deformable nature.

When the dead end portion of the groove 8 reaches the engaging pin 59, the rotation of the cylindrical hood 54 is stopped. The interfering portion 20 (or 20a) is positioned spaced from the dead end by a predetermined distance away so that the engaging pin 59 can be held firmly without any play between the dead end and the interfering portion 20 (or 20a). In other words, the cylindrical hood 54 is prevented from unexpectedly rotating in the opposite direction due to its weight. With these arrangements, the cylindrical hood 54 is fixed at the most extended position wherein the cylindrical hood 54 extends in front of the lens unit 2.

When a sufficient large rotational force is applied to the extended cylindrical hood 54 in the opposite direction, the interfering portion 20 (or 20a) deforms elastically as explained above, the cylindrical hood 54 retracts toward the rear end of the lens unit 2. When the front edge bent portion 8x of the feed groove 8 reaches the engaging pin 59, if slightly stronger rotational force is applied to the cylindrical hood 54, the interfering portion 20 (or 20a) formed in the front edge bent portion 8x deforms elastically as the head 59b of the engaging pin 59 is abutted against, then the engaging pin 59 finally reaches the front dead end of the feed groove 8. In this retracted condition, the cylindrical hood 54 covers the overall length of the lens unit 2, as shown FIG. 15, and the engaging pin 6 is firmly held without any play between the interfering portion 20 (20a) and the front dead end of the feed groove 8.

FIGS. 22A through 23B show modified embodiments of the present invention.

FIGS. 22A and 22B show a first modification, in which an male thread 52b is formed on the outer circumferential surface of the front end side portion of the lens barrel 3 and a female thread 57b is formed on the inner circumferential surface of the support ring 57, thereby the cover unit 56 can be coupled to the lens unit 2 with the engagement of the threads 52b with 57b.

According to the first modification, even if the frame 71 of a filter is screwed to the internal thread 52c formed on the inner circumferential surface of the lens barrel 3, it becomes possible to couple the cover unit 56 to the lens unit 2 by screwing the support ring 57 onto the outer periphery of the lens barrel 3 as shown in FIG. 22B.

Furthermore, in the first modification, any detachable method for coupling the support ring 57 to the lens barrel 3 such as a bayonet method, a screw stop method, etc., can be employed.

FIGS. 23A and 23B show a second modification, in which the cover unit 56 can be coupled to a conventional lens unit. Namely, a U-shaped external screw portion 56a to be engaged with the inner threaded portion 52c is protrudingly formed on a surface opposite to the supporting surface 61. In this case, since the inner threaded portion 52c has a conventional form, even if the frame 71b of the filter 70, etc., is screwed to the lens barrel 3, the external screw portion 56a can be screwed to the internal thread 71b formed on the inner surface of the frame 71. Thus, the cover unit 56 can be coupled to the conventional lens unit with installing a filter.

Although in the above-mentioned embodiment and modifications thereof, the lens barriers are opened with the engagement of pin members and protrusions, an opening mechanism of the lens barriers may be made to be opened and closed electrically by means of combination of gear and pinion. Also, it may be possible to employ the mechanism such that the main switch of the camera is turned ON when the hood is extended. Furthermore, according to the modifications illustrated in FIGS. 22A, 22B, 23A and 23B, various accessories such as close-up lenses, a ring light and the like can be mounted when the cover unit is coupled thereto.

According to the above-mentioned embodiments, a lens hood and a lens barrier are unified so that construction can be made compact and the mounting to the tip part of a camera lens can be made simple. As the lens barrier is advanced and retracted in link movement with advance and retract of the lens hood, it is possible to open the lens barrier instantly only by advancing the camera hood at the time required, and the lens barrier can be closed by only retracting the lens hood after photography is over. Furthermore, lens filters, close up lenses, a ring light and other lens accessories can be mounted by making the cover unit detachable, or else it will be possible to attach the camera lens reversely to the camera body to take close-up photographs. Also, the lens cleaning can be made easier. In addition, the installation can be attached to conventional camera lenses, and also the assembly thereof can be attached to large bore lenses and wideangle lenses, and various type of uses can be selectively employed to suit the needs of users.

What is claimed is:

1. A cover unit for a lens unit having a lens barrel, said cover unit comprising:
   a cylindrical support member to be coupled to an end of said lens barrel, said support member having at least one engaging pin member provided at a predetermined position on an outer circumferential surface thereof;
   a cylindrical hood member superposed on said lens barrel;
   at least one spiral shaped cam groove formed on an inner circumferential surface of said hood member, said at least one engagement pin member engaging said at least one cam groove whereby the engagement of said at-least-one engaging pin member with said at-least-one cam groove causes said hood member to move in its axial direction relative to said support member in response to rotation of said hood member relative to said support member;
   lens barrier means supported by said support member for covering said end of said lens barrel, said lens barrier means being openable; and
   drive means for driving said lens barrier means in accordance with the movement of said hood member.

2. The cover unit according to claim 1, wherein at least one engaging portion is formed in said at-least-one cam groove, a movement of said hood member being prevented when said at-least-one pin member is engaged with said engaging portion.

3. The cover unit according to claim 2, wherein said engaging portion is provided at either end of said at-least-one cam groove.

4. The cover unit according to claim 3, wherein said engaging portion has an extending groove portion which extends in the circumferential direction of said hood member, whereby said hood member is prevented from moving in its axial direction when said at-least-one pin member engages with said extending groove portion.

5. The cover unit according to claim 4, wherein said extending groove portion is formed with a pair of projections for interfering the relative movement of said extending groove portion with respect to said at-least-one pin member, the rotational movement of said hood member being prevented when said pin member is located between a dead end of said extending groove portion and said pair of projections.

6. The cover unit according to claim 4, wherein said extending groove portion is formed with a convex portion on a bottom surface of said extending groove portion for interfering the relative movement of said extending groove portion with respect to said at-least-one pin member, the rotational movement of said hood member being prevented when said pin member is located between a dead end of said extending groove portion and said convex portion.

7. The cover unit according to claim 1, wherein said cylindrical hood member is made of a synthetic resin material having a predetermined elasticity.

8. The cover unit according to claim 1, wherein the head portion of said pin member is formed in a tapered configuration.

9. The cover unit according to claim 1, wherein a cutout portion is formed on the head of said pin member for allowing dust to pass through.

10. The cover unit according to claim 1, wherein said lens barrier means comprises at least one plate member which is capable of opening and closing said end of said lens barrel, said at-least-one plate member being biased to close said end of said lens barrel.

11. The cover unit according to claim 10, wherein said support member has a small outer diameter portion having a predetermined length, and wherein said drive means comprises an operation member for opening said at-least-one plate member slidably fitted on said small outer diameter portion of said support member, said operation member sliding on said small diameter portion between first and second positions in the axial direction thereof, said operation member moves in accordance with the movement of said hood member, wherein said at-least-one plate member is opened when said operation member is located at said first position.

12. The cover unit according to claim 11, wherein a protruded portion is formed on said plate member on the surface which faces said end of lens barrel when being closed, and a drive member for pushing said protruded portion is provided with said operation member, wherein said operation member pushes said protruded portion when said operation member is located at said first position, while said operation member does not push said protruded portion when said operation member is located said second position.

13. The cover unit according to claim 12, wherein an operating protruded portion is provided on said hood member, said operating protruded portion being contacted to move said operation member from said second position to said first position when said hood member is extended, whereby said at-least-one plate member is opened when said hood member is extended.

14. The cover unit according to claim 11, which further comprises at least one spring member for biasing said operation member so as to be located at said second position.

15. The cover unit according to claim 11, wherein at least one slit extending in the axial direction of said support member is provided on said small diameter portion, and wherein at least one protruded tongue portion to be received by said at-least-one slit is formed on the inner circumferential surface of said operation member, whereby rotary movement of said operation member with respect to said support member is prevented.

16. The cover unit according to claim 19, wherein said at-least-one plate member is opened at an angle at which the angle of view of said lens unit is not interfered by said plate member.

17. The cover unit according to claim 10, wherein there are four pieces of said plate members, each of which has a substantially triangular shape, the pivotal axes of said four pieces of plate members being arranged to form substantially a rectangle.

18. The cover unit according to claim 17, wherein one of said plate members is provided with a shield plate for covering an opening which is formed when said plate members are closed.

19. The cover unit according to claim 18, wherein said lens unit is a photographing lens unit to be installed to a camera, wherein said rectangle formed by the pivotal axes of said plate members does not interfere with the image formed on a film plane of said camera.

20. The cover unit according to claim 1, wherein said support member has a threaded portion on the inner surface thereof, wherein said lens barrel has a threaded portion on the outer surface thereof, said cover unit being coupled to said lens barrel with the engagement between said threaded portions of said support member and said lens barrel.

21. The cover unit according to claim 20, wherein said lens barrel has an inner threaded portion for receiving an optical element having an outer threaded portion, and wherein said threaded portions are formed long enough in the axial direction of said lens barrel so that said support member can be screwed onto said lens barrel even if said optical element is screwed in said lens barrel.

22. The cover unit according to claim 1, wherein said lens barrel has an inner threaded portion on the inner circumferential surface thereof in order to receive an optical element provided with an outer threaded portion to be engaged with said inner threaded portion, and wherein one end of said support member is formed in a substantially U-shaped portion having inner cylindrical portion and an outer cylindrical portion so that the end portion of said lens barrel is fitted in said U-shaped portion, the outer circumferential surface of said inner cylindrical portion is threaded to be engaged with said inner threaded portion of said lens barrel, whereby said support member can be coupled to said lens unit even if an optical element having a first outer threaded portion to be engaged with said inner threaded portion of said lens barrel at one end and a second inner threaded portion having the same diameter as said inner threaded portion of said lens barrel is adapted to said lens barrel.

23. A lens unit, comprising:
a lens barrel having at least one engaging pin member provided at a predetermined position on an outer circumferential surface thereof; and
a cylindrical hood member superposed on said lens barrel,
at least one spiral-shaped cam groove slidably receiving said pin member therein, said one cam groove being formed on an inner circumferential surface of said hood member, whereby the engagement of said at-least-one engaging pin member with said at-least-one cam groove causes said hood member to move in its axial direction relative to said lens unit in response to rotation of said hood member relative to said lens barrel.

24. The lens unit according to claim 23, wherein at least one engaging portion is formed in said at-least-one cam groove, a movement of said hood member being prevented when said at-least-one pin member is engaged with said engaging portion.

25. The lens unit according to claim 24, wherein said engaging portion is provided at either end of said at-least-one cam groove.

26. The lens unit according to claim 25, wherein said engaging portion have an extending groove portion which extends in the circumferential direction of said hood member, whereby said hood member is prevented from moving in its axial direction when said at-least-one pin member engages with said extending groove portion.

27. The lens unit according to claim 26, wherein said extending groove portion is formed with a pair of projections for interfering the relative movement of said extending groove portion with respect to said at-least-one pin member, the rotational movement of said hood member being prevented when said pin member is located between a dead end of said extending groove portion and said pair of projections.

28. The lens unit according to claim 26, wherein said extending groove portion is formed with a convex portion on a bottom surface of said extending groove portion for interfering the relative movement of said extending groove portion with respect to said at-least-one pin member, the rotational movement of said hood member being prevented when said pin member is located between a dead end of said extending groove portion and said convex portion.

29. The lens unit according to claim 26, wherein said engaging portion has at least one intermediate engaging portion, a predetermined amount of said hood member being protruded with respect to a plane including the front side end of said lens barrel when said intermediate engaging portion is engaged with said at-least-one pin member.

30. The lens unit according to claim 29, wherein two pairs of projections are opposedly provided on the side wall of said at-least-one cam groove, said two pairs of projections interfering the relative movement of said pin member with respect to said at-least-one cam groove, the movement of said hood member being prevented when said pin member is held between said two pairs of projections.

31. The lens unit according to claim 23, wherein said cylindrical hood member is made of a synthetic resin material having a predetermined elasticity.

32. The lens unit according to claim 23, wherein the head portion of said pin member is formed in a tapered configuration.

33. The lens unit according to claim 23, wherein a cutout portion is formed on the head of said pin member for allowing dust to pass through.

34. The lens unit according to claim 23, wherein at least one another cam groove having length different from that of said at-least-one cam groove is formed on the inner circumferential surface of said cylindrical hood member.

35. The lens unit according to claim 34, wherein said at-least-one another cam groove is formed on the bottom surface of said at-least-one groove, the width of said at-least-one another groove is smaller than that of said at-least-one groove.

36. The lens unit according to claim 34, wherein said at-least-one another groove is arranged to be spaced apart from said at-least-one groove in the circumferential direction of said cylindrical hood member.

37. The lens unit according to claim 36, wherein at least third and fourth cam groove is respectively formed on the bottom surfaces of said at-least-one and said at-least-one another cam grooves, the widths of said third and fourth grooves are narrower than those of said at-least-one cam groove and said at-least-one another cam groove, respectively.

38. The lens unit according to claim 23, which is a lens unit for a camera.

39. The lens unit according to claim 23, wherein a plurality of kinds of cam grooves for slidably receiving said pin member are provided on said inner circumferential surface of said hood member.

40. A camera, comprising:
- a photographing lens;
- a lens barrel for accommodating said photographing lens, said lens barrel having at least one engaging pin member at a predetermined position on an outer circumferential surface thereof; and
- a cylindrical hood member superposed on said lens barrel, at least one spiral shaped cam groove formed on an inner circumferential surface of said hood member, said at least one engagement pin member engaging said at least one cam groove whereby the engagement of said atleast-one engaging pin member with said at-least-one cam groove causes said hood member to move in its axial direction relative to said lens unit in response to a rotation of said hood member relative to said lens barrel.

* * * * *

UNITED STATES PATENT AND TRADEMARK OFFICE
CERTIFICATE OF CORRECTION

PATENT NO. : 5,294,954
DATED : March 15, 1994
INVENTOR(S) : Hiroshi Nomura and Tomoaki Kobayashi It is certified that error appears in the above-identified patent and that said Letters Patent is hereby corrected as shown below:

On the Title Page, item [30], Foreign Application Priority Data, please list the following priority documents:
November 27, 1990 [JP]  Japan......2-123635
November 28, 1990 [JP]  Japan......2-124232
November 28, 1990 [JP]  Japan......2-124233

Signed and Sealed this

Thirteenth Day of September, 1994

Attest:

BRUCE LEHMAN

Attesting Officer

Commissioner of Patents and Trademarks